(12) United States Patent
Gerhard et al.

(10) Patent No.: US 8,856,479 B2
(45) Date of Patent: Oct. 7, 2014

(54) IMPLEMENTING STORAGE ADAPTER PERFORMANCE OPTIMIZATION WITH HARDWARE OPERATIONS COMPLETION COALESCENCE

(75) Inventors: Adrian C. Gerhard, Rochester, MN (US); Lyle E. Grosbach, Rochester, MN (US); Daniel F. Moertl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 13/451,738

(22) Filed: Apr. 20, 2012

(65) Prior Publication Data

US 2013/0282969 A1    Oct. 24, 2013

(51) Int. Cl.
*G06F 12/00* (2006.01)
*G06F 13/00* (2006.01)
*G06F 13/28* (2006.01)
*G06F 3/06* (2006.01)
*G06F 13/12* (2006.01)

(52) U.S. Cl.
CPC .............. *G06F 13/28* (2013.01); *G06F 3/0659* (2013.01); *G06F 3/061* (2013.01); *G06F 13/126* (2013.01)
USPC ........................... 711/168; 711/154; 711/150

(58) Field of Classification Search
CPC ....... G06F 13/28; G06F 13/126; G06F 3/061; G06F 3/0659
USPC ..................... 711/150, 154, 168–169; 710/22
See application file for complete search history.

(56) References Cited

U.S. PATENT DOCUMENTS

| | | | |
|---|---|---|---|
| 5,850,567 A * | 12/1998 | Young | 710/5 |
| 5,892,969 A | 4/1999 | Young | |
| 6,157,964 A | 12/2000 | Young | |
| 6,434,630 B1 * | 8/2002 | Micalizzi et al. | 710/5 |
| 7,130,932 B1 * | 10/2006 | Ghaffari | 710/22 |
| 2002/0004904 A1 | 1/2002 | Blaker et al. | |
| 2007/0028145 A1 | 2/2007 | Gerhard et al. | |

* cited by examiner

*Primary Examiner* — Ryan Bertram
(74) *Attorney, Agent, or Firm* — Joan Pennington

(57) ABSTRACT

A method and controller for implementing storage adapter performance optimization with chained hardware operations completion coalescence, and a design structure on which the subject controller circuit resides are provided. The controller includes a plurality of hardware engines, and a processor. A plurality of the command blocks are selectively arranged by firmware in a predefined chain including a plurality of simultaneous command blocks. All of the simultaneous command blocks are completed in any order by respective hardware engines, then the next command block in the predefined chain is started under hardware control without any hardware-firmware (HW-FW) interlocking with the simultaneous command block completion coalescence.

25 Claims, 8 Drawing Sheets

500
1 BYTE BASE ENABLE REGISTER

| 506 | 504 | 502 |
|---|---|---|
| BITS 7:3=RESERVED | BIT 2=ENB | BITS 1:0=ID |

FIG. 5A 510
4 BYTE OP DONE EVENT Q ENTRY

| BIT 31 522 | BIT 30:14 520 | BIT 13:10 518 | BIT 9 516 | BIT 8 514 | BIT 7:0 512 |
|---|---|---|---|---|---|
| RSVD | CB OFFSET | STATUS | FAIL | '1' | 404 BYTE 1 EVENT ID |

FIG. 5B

IMPLEMENTING STORAGE ADAPTER PERFORMANCE OPTIMIZATION WITH HARDWARE OPERATIONS COMPLETION COALESCENCE

FIELD OF THE INVENTION

The present invention relates generally to the data processing field, and more particularly, relates to a method and controller for implementing storage adapter performance optimization with chained hardware operations completion coalescence, and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are to connect the host computer system to the storage adapter and to connect the storage adapter to the storage I/O devices, such as, Peripheral Component Interconnect Express (PCIe), Serial Attach SCSI (SAS), Fibre Channel, and InfiniBand.

For many years now, hard disk drives (HDDs) or spinning drives have been the dominant storage I/O device used for the persistent storage of computer data which requires online access. Recently, solid state drives (SSDs) have become more popular due to their superior performance. Specifically, SSDs are typically capable of performing more I/Os per seconds (IOPS) than HDDs, even if their maximum data rates are not always higher than HDDs.

Various arrangements of HDDs and SSDs have been used for the persistent storage of computer data, for example, a redundant array of inexpensive drives (RAID), such as RAID-10. RAID-10 writes requires the same data be written to two different devices. In one known design, firmware builds a two Command Block chain and the hardware completes the Command Blocks sequentially. The firmware could have instructed the hardware to issue the RAID-10 writes simultaneously, thereby potentially reducing the RAID-10 write latency by almost half, but then firmware is required to process two op completion, HW-FW interlocks.

Under some workloads, using SSD devices the extra firmware response time to process two extra HW-FW interlocks may exceed the latency saved by issuing the two SSD write ops simultaneously. Under some workloads, using SSD devices, the extra firmware service time to process two extra HW-FW interlocks will add significant firmware overhead causing the storage adapter command throughput to suffer. In these cases, attempting to optimize for latency by issuing simultaneous writes can hurt adapter command throughput by as much as 30%.

RAID 10 reads to SSD devices could complete in half the time if a read was split into two parts and each half was sent to a different device and executed simultaneously. In one known design, firmware could build a chain with two SAS (Serial Attach SCSI) command blocks and the hardware would complete them sequentially. Also firmware could build a chain with one SAS command block and not split the read. The firmware could also have instructed the hardware to issue two SAS command blocks simultaneously, thereby reducing the RAID 10 read latency by almost half in a lightly loaded adapter, but then firmware would have to process two op completion, HW-FW interlocks.

Under some workloads, using SSD devices the extra firmware response time to process two extra HW-FW interlocks may exceed the latency saved by issuing the two SSD read ops simultaneously. Under some workloads, using SSD devices, the extra firmware service time to process two extra HW-FW interlocks will add significant firmware overhead causing the storage adapter command throughput to suffer. In these cases, attempting to optimize for latency by issuing simultaneous reads can hurt adapter command throughput by as much as 30%.

A need exists for an effective hardware engine method and controller for implementing storage adapter performance optimization with chained hardware operations completion coalescence while efficiently and effectively maintaining the same number of HW-FW interlocks between a sequential Command Block chain and a sequential and simultaneous Command Block chain, eliminating the required addition HW-FW interlock of prior art arrangements.

As used in the following description and claims, the terms controller and controller circuit should be broadly understood to include an input/output (TO) adapter (IOA) and includes an IO RAID adapter connecting various arrangements of a host computer system and peripheral storage I/O devices including hard disk drives, solid state drives, tape drives, compact disk drives, and the like.

SUMMARY OF THE INVENTION

Principal aspects of the present invention are to provide a method and a controller for implementing storage adapter performance optimization with chained hardware operations completion coalescence, and a design structure on which the subject controller circuit resides. Other important aspects of the present invention are to provide such method, controller, and design structure substantially without negative effects and that overcome many of the disadvantages of prior art arrangements.

In brief, a method and controller for implementing storage adapter performance optimization with chained hardware operations completion coalescence, and a design structure on which the subject controller circuit resides are provided. The controller includes a plurality of hardware engines, and a processor. A plurality of the command blocks are selectively arranged by firmware in a predefined chain including a plurality of simultaneous command blocks. The simultaneous command blocks are completed in any order by respective hardware engines, and the next command block in the predefined chain is started under hardware control without any hardware-firmware (HW-FW) interlocking with the simultaneous command block completion coalescence. Hardware notifies the processor when the hardware engines have completed the predefined chain.

In accordance with features of the invention, an event queue is coupled to the processor notifying the processor of a plurality of predefined events. Each command block is designed to control an operation in one of the plurality of hardware engines including the hardware engine writing a predefined event queue entry notifying the processor of completion of the predefined chain.

In accordance with features of the invention, the predefined hardware event queue entry is written when the last in chain command block completes. The predefined hardware event queue entry is written when a command block fails with an error.

In accordance with features of the invention, the predefined chain of the plurality of command blocks is executed without any firmware interaction between the initial setup and the completion of the series of operations including the simultaneous command blocks. The predefined chain minimizes the hardware engines and processor interaction.

In accordance with features of the invention, a coalescence status RAM stores predefined information for each of the command blocks in the predefined chain including the simultaneous command blocks used for placing a next command block entry onto a HW work queue and used for discarding or allowing a HW event queue to be written.

In accordance with features of the invention, all the simultaneous command blocks are completed by respective hardware engines before the next command block in the chain is executed.

BRIEF DESCRIPTION OF THE DRAWINGS

The present invention together with the above and other objects and advantages may best be understood from the following detailed description of the preferred embodiments of the invention illustrated in the drawings, wherein:

FIG. 5A illustrates an example 1 byte Base Enable Register for implementing storage adapter performance optimization with chained hardware operations completion coalescence in accordance with the preferred embodiment;

FIG. 5B illustrates an example 4 byte op Done Event Queue Entry for implementing storage adapter performance optimization with chained hardware operations completion coalescence in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller implement enhanced storage adapter performance and performance optimization with chained hardware operations completion coalescence, and a design structure on which the subject controller circuit resides is provided.

Figure 1:
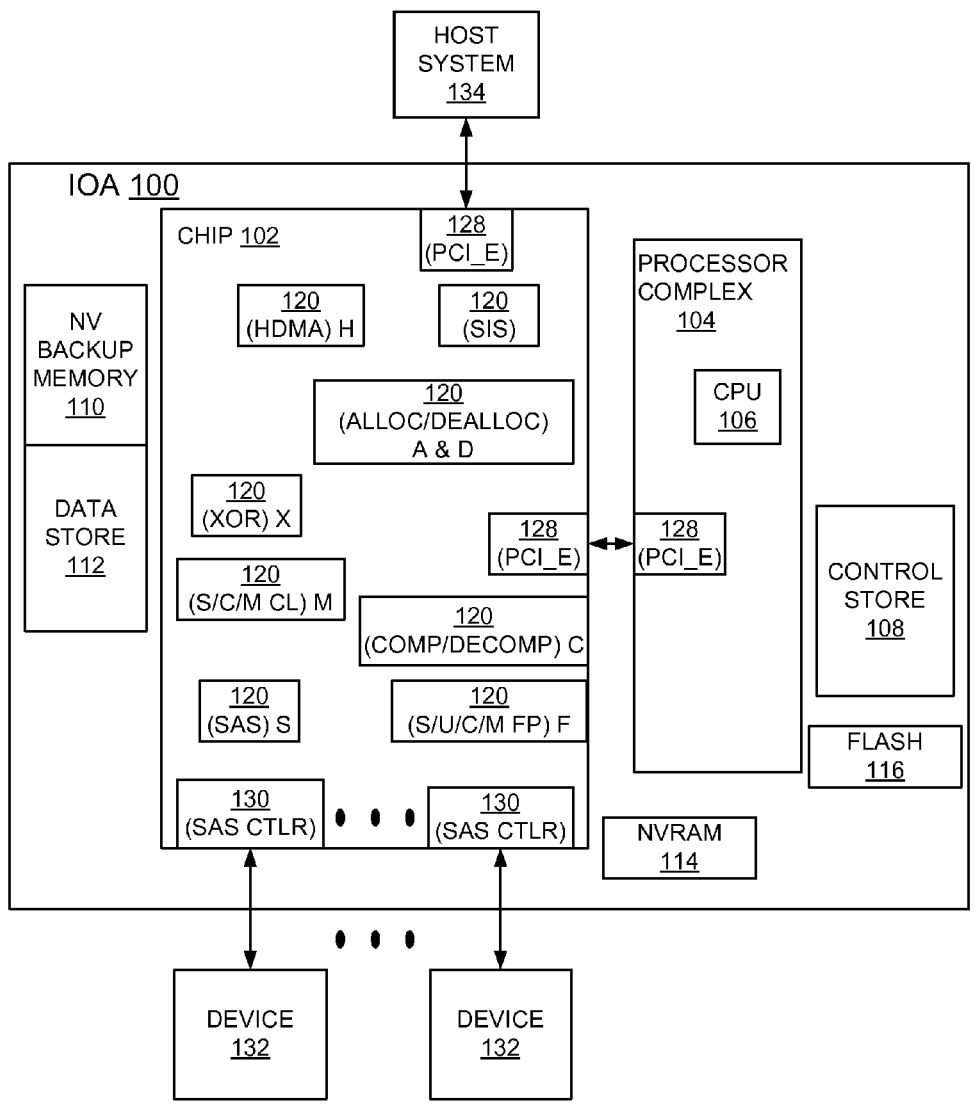
FIG. 1 is a schematic and block diagram illustrating an exemplary system for implementing storage adapter performance optimization with chained hardware operations completion coalescence in accordance with the preferred embodiment.

Having reference now to the drawings, in FIG. 1, there is shown an input/output adapter (IOA) or controller in accordance with the preferred embodiment generally designated by the reference character 100. Controller 100 includes a semiconductor chip 102 coupled to at least one processor complex 104 including one or more processors or central processor units (CPUs) 106. Controller 100 includes a control store (CS) 108, such as a dynamic random access memory (DRAM) proximate to the CPU 106 providing command block, work queue and event queue storage. Controller 100 includes a non-volatile (NV) backup memory 110 and a data store (DS) 112 providing data and scratch buffers for command block set up and processing, for example, performed by hardware. Controller 100 includes a non-volatile random access memory (NVRAM) 114, and a flash memory 116.

In accordance with features of the invention, controller 100 implements methods that uniquely chains together hardware operations in order to minimize hardware/firmware interactions in order to maximize performance including simultaneous command blocks without requiring any HW-FW interlocking for the simultaneous command blocks with completion coalescence. The hardware (HW) chaining is completely heterogeneous; asynchronous, not requiring synchronization or defined timed slots for operations; fully free form with any HW engine chained to any HW engine, and operational policy in FW dispatching at HW speeds.

Controller semiconductor chip 102 includes a plurality of hardware engines 120, such as, a hardware direct memory access (HDMA) engine 120, a SIS engine 120, an allocate and de-allocate engine 120, an XOR or sum of products (SOP) engine 120, a Serial Attach SCSI (SAS) engine 120, a set/update/clear/mirror footprint (S/U/C/M FP) engine 120, and a compression/decompression (COMP/DECOMP) engine 120.

In accordance with features of the invention, substantial conventional firmware function is moved to HW operations performed by the hardware engines 120. The hardware engines 120 are completely heterogeneous, and are fully extensible with chaining any engine to any other engine enabled.

In accordance with features of the invention, in a predefined chain including a plurality of simultaneous command blocks, all of the simultaneous command blocks are completed in any order by respective hardware engines, then the next command block in the predefined chain is started under hardware control without any hardware-firmware (HW-FW) interlocking with the simultaneous command block completion coalescence. Hardware notifies the processor when the hardware engines have completed the predefined chain. Previously FW would have stopped the chain after the simultaneous command blocks, processed the simultaneous command block completions, then FW would have started the rest of the chain.

As shown, controller semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. A host system 134 is connected to the controller 100 with a PCIe high speed system interconnect. It should be understood that an external processor complex 104 is not required and could be embedded in the controller semiconductor chip 102.

DS 112, for example, 8 GB of DRAM, stores volatile and or non-volatile 4 KB pages of Data, 32-byte cache line (CL) with one CL for each non-volatile page of the write cache in a contiguous area of DS and 32-byte parity update footprint (PUFP) in a contiguous area of DS after the CL area.

The controller semiconductor chip 102 and control store (CS) 108 store FW stack and FW command blocks, and other structures and command blocks, such as illustrated and described with respect to FIG. 3, and FIGS. 4A, 4B, 5A, 5B, 6 and 7. Other structures in the CS 108 include FW structures and stacks. The control store (CS) 108 includes a command block (CB) buffer area, such as 8 MB size and 8 MB alignment, a HW Event Queue, such as 4 MB size and 4 MB alignment, providing 1M entries of 4 B each, SIS SEND Queue, such as 64 KB size and 64 KB alignment, providing 4K entries of 16 B each, Index Free List Volatile and Index Free List Non-Volatile, each such as 4 MB size and 4 MB alignment, providing 1M entries of 4 B each, HW Work Queues (WQ), such as 512 KB size and 512 KB alignment, providing 32 WQ of 16 KB each. Other structures in the CS 108 include Page Table Index Lists, such as 4 B, 1-N entries of 4 B each, which can be anywhere in the 256 MB space and are often within the 8 MB CS buffer area, CS target Buffers of 128 B alignment, where each buffer is 1 KB, and can be anywhere in the 256 MB space, and HW CB of 64 B alignment, for example, which are within the 8 MB CS buffer area.

Figure 2:
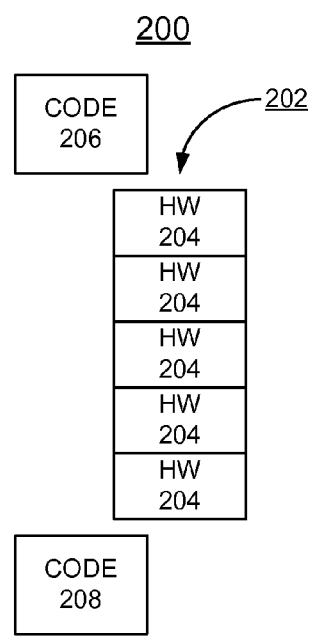
FIG. 2 illustrates example chained hardware operations minimizing hardware and firmware interactions in accordance with the preferred embodiment.

Referring to FIG. 2, there are shown example chained hardware operations minimizing hardware and firmware interactions in accordance with the preferred embodiment generally designated by the reference character 200. The chained hardware operations 200 include a chain 202 of a plurality of sequential operations by hardware (HW) 204 with an initial interaction with code or firmware (FW) 206 at the initial setup and another interaction with FW 208 at the completion of the series or chain 202 of operations by HW 204.

In accordance with features of the invention, the types of chained operations include Buffer Allocate, Buffer Deallocate, SAS Read-XOR, SAS Write, Setting Parity Update Footprint (PUFP), Clearing PUFP, Mirrored write of a PUFP to a remote adapter, Mirrored write of cache data to remote adapter, and the like. For example, the following is an example of chained operations for a RAID-5 write: a) Buffer allocate, b) Read-XOR of data, c) Setting of PUFP, d) Write of data, e) Update parity footprint, f) Read-XOR of parity, g) Write of parity, h) Clearing of PUFP, and i) Buffer deallocate.

As shown in FIG. 2, the chained hardware operations 200 of the invention, significantly reduces the firmware path length required for an I/O operation. The chained hardware operations 200 of the invention are arranged to minimize hardware/firmware interactions in order to maximize performance.

Figure 3:
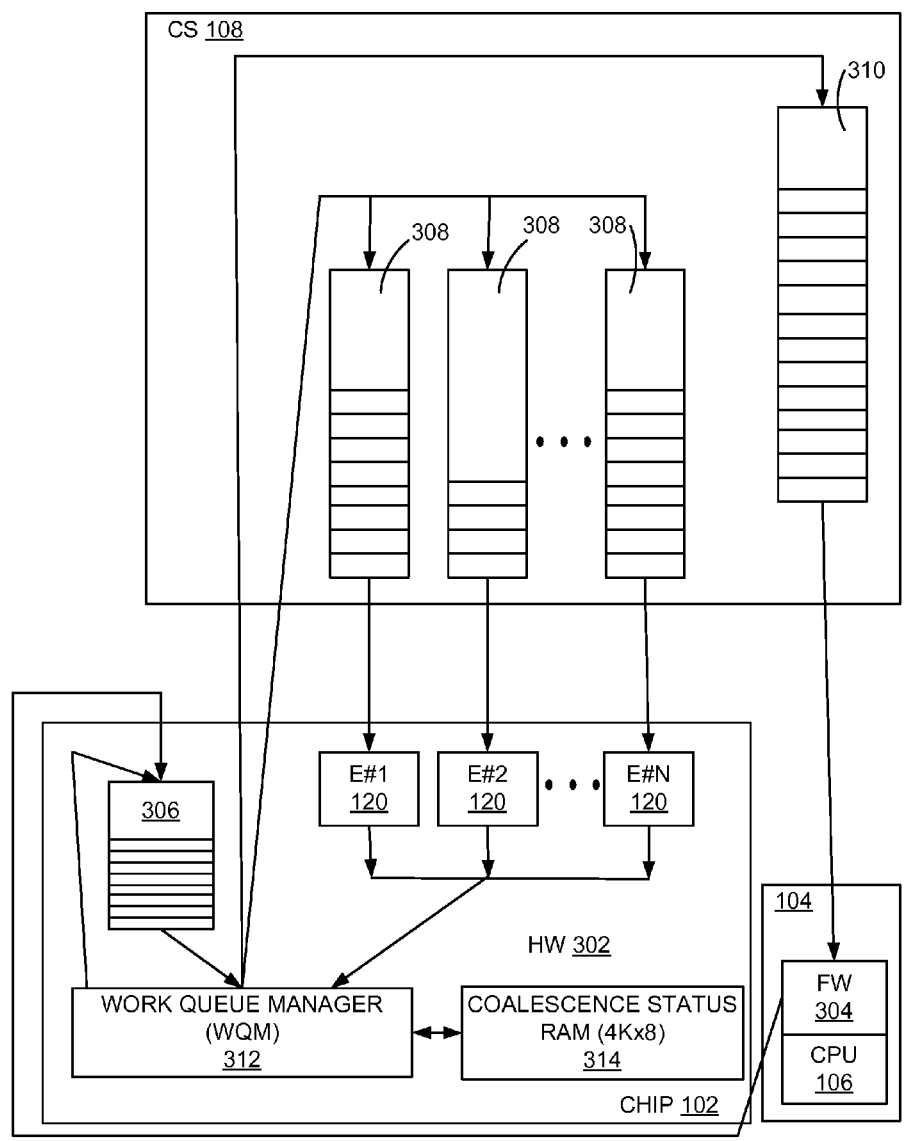
FIG. 3 illustrates an enhanced hardware (HW) and firmware (FW) interface including a plurality of example hardware (HW) Work Queues and a HW Event Queue stored in the control store (CS) in accordance with the preferred embodiment.

Referring to FIG. 3, there is shown an enhanced hardware (HW) and firmware (FW) interface generally designated by the reference character 300 in accordance with the preferred embodiment. The HW/FW interface 300 includes a HW block 302 including the plurality of HW engines 120 in the controller chip 102 and a firmware block 304 provided with the CPU 106 in the processor complex 104. The HW/FW interface 300 includes a global hardware (HW) Work Queue 306, such as a small embedded array in the controller chip 102. The global HW Work Queue 306 is coupled to each of a plurality of hardware (HW) Work Queues 308.

Each of the plurality of hardware (HW) Work Queues 308 is applied to respective hardware engines 1-N, 120 within the chip 102. A HW Event Queue 310 is coupled to firmware (FW) 304 providing completion results to the processor complex 104. A Work Queue Manager (WQM) 312 in the controller chip 102 is coupled to each of the plurality of hardware (HW) Work Queues 308 and hardware engines 1-N, 120, and to the HW Event Queue 310. The global HW work queue 306 includes a queue input coupled to FW 304 in the processor complex 104 and a queue input coupled to the Work Queue Manager 312 in the controller chip 102. The Work Queue Manager 312 reads an entry from the global HW work queue 306 and selectively provides an entry to a targeted HW Work Queues 308, an input to the HW Event Queue 310, or discards the entry in accordance with features of the invention, for example, as illustrated and described with respect to FIG. 6, and FIGS. 4A, 4B, 5A, and 5B.

The controller semiconductor chip 102 and HW/FW interface 300 includes a coalescence status random access memory (RAM) 314 in accordance with the present invention. The coalescence status RAM 314, such as 4096×8 or 4K×8 RAM is written by FW with an 8-bit value, the number of bits set to '1' is the number of simultaneous ops that will run for a Command Chain, such as command chain 720 illustrated and described with respect to FIG. 7. Controller 100 supports 4096 active Command Chains, so the coalescence status RAM 314 preferably is implemented with the 4K×8 RAM as shown. The bit position matches the CB positions, so FW writes a value of 0x03, 0x07, 0x0F, 0x1F, 0x3F, 0x7F, 0xFF for chains of 2, 3, 4, 5, 6, 7, or 8 simultaneous ops. The HW Work Queues 308, and the HW Event Queue 310 are stored in the control store (CS) 108.

The hardware engines 120 are arranged to DMA data from the host system 134 to the controller 100. The HDMA engine 120 DMAs the data from host system 134 to the CS 108 or DS 112, then notifies FW via the HW Event Queue 310. The hardware engines 120 are arranged to run some functions in parallel, such as 8 or 12 SAS engines 120, 4 host DMA engines 120, and the like. The hardware engines 120 are arranged to run multiple operations on different steps of the same function, such as an HDMA engine 120 fetches data from the host system 134 at the same time that another HDMA engine 120 is DMAing other data to the host system 134.

Chained or stand alone CB execution begins when an entry is removed from the Global HW Work Queue 306 and dispatched by the Work Queue Manager 312 to one of the HW Work Queues 308 coupled to one of the Hardware Engines 120. Hardware Engines 120 in FIG. 3 can execute a chain of command blocks, allowing multiple simultaneous Command Blocks, for example, up to 8 Command Blocks to run or be executed simultaneously and the multiple simultaneous Command Blocks to complete in any order, then HW of this invention starts the next Command Block in the chain, such as chain 720 of command blocks 400 shown in FIG. 7 and further illustrated in FIGS. 4A, and 4B, FIGS. 5A, and 5B, and FIG. 6. The HW CB 400 links to the next operation in the predefined chain when the current engine 120 completes execution of its operation in the predefined chain. The mechanism for the next HW CB 400 in a respective predefined chain to eventually start execution is initiated by the respective hardware engine 120. The hardware engine 120 when completing execution of its HW CB 400 in the chain provides a new CB address, together with the CB ID Next Linked field 406 that is given to the Work Queue Manager 312 by the hardware engine 120. The Work Queue Manager 312 then adds a new entry to Global HW WQ 306. The next CB in the predefined chain will then execute when this entry is removed from the Global HW WQ 306 and dispatched to one of the HW Work Queues 308.

Figure 4A:
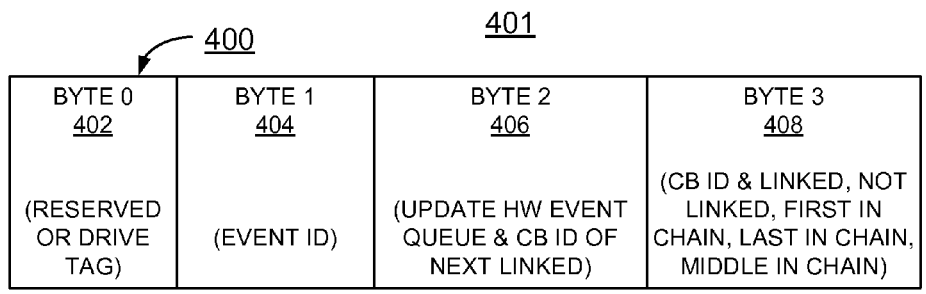
FIG. 4A illustrates an example common header of a command block in accordance with the preferred embodiment.

In accordance with features of the invention, each command block 400 includes a common header 401, for example, as illustrated in FIG. 4A. The command block common header 401 includes a command block ID, a chain position, and a next command block ID. The command block chain position identifies a first in chain, a last in chain, middle in linked chain, or stand alone. The common header 401 includes a predefined hardware event queue entry selectively written when the command block completes. The predefined hardware event queue entry is written when a stand alone command block completes and the last in chain command block completes. The predefined hardware event queue entry is written when command block fails with an error.

Referring also to FIG. 4A, there is shown an example common header generally designated by the reference character 401 of the command block 400 in accordance with the preferred embodiment. Each command block header 401 includes a byte 0, 402, for example, reserved or drive tag.

Each command block header 401 includes a byte 1, 404 including for example, update HW event queue indication and an event ID entry. A predefined hardware event queue entry 404 is selectively written when the command block completes. The predefined hardware event queue entry 404 is written when a stand alone command block completes or a last in chain command block completes. The predefined hardware event queue entry 404 is written when command block fails with an error.

Each command block header 401 includes a byte 2, 406 including an update HW Event Queue entry and a next command block engine identification (ID) 406. The HW Event Queue 310 shown in FIG. 3 is a circular first-in first-out (FIFO) in the CS 108. The HW Event Queue 310 is aligned on a 4M-byte address boundary, and is 4M-bytes in size. This size allows the queue to be a history of the last 1M events. FW periodically reads and removes the entries from the HW Event Queue.

Each command block header 401 includes a byte 3, 408, including a command block engine ID and a chain position 408. The command block chain position 408 identifies a first in chain, a last in chain, middle in linked chain, or stand alone command block chain position. Based on byte 2, 406, command block completion status, and byte 3, 408, HW selects if an entry should be written to the HW Event Queue 310, such as 4-byte entries 510 as illustrated and described with respect to FIG. 5B, or the next work queue 308.

Figure 4B:
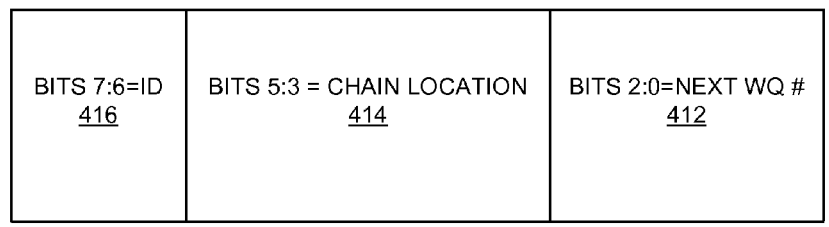
FIG. 4B illustrates a selective write HW event queue entry byte of the common header of FIG. 4A for implementing storage adapter performance optimization with chained hardware operations completion coalescence in accordance with the preferred embodiment.

Referring also to FIG. 4B, there is shown an example details of common header byte 1, 404 of the common header 401 of FIG. 4A for implementing storage adapter performance optimization with chained hardware operations completion coalescence in accordance with the preferred embodiment. Common header byte 1, 404 includes bits 2:0, 412 providing a next work queue #, bits 5:3, 414 providing a chain location, and bits 7:6, 416 providing an ID for the selective write HW event queue entry.

FIG. 5A illustrates an example 1 byte Base Enable Register generally designated by the reference character 500 for implementing storage adapter performance optimization with chained hardware operations completion coalescence in accordance with the preferred embodiment. The 1 byte Base Enable Register 500 includes bits 1:0, 502 providing an ID and bit 2, 504 providing an enable, with bits 7:3, 506 reserved.

Referring also to FIG. 4B, the bits 7:6, 416 of the common header byte 1, 404 is the tag stating this is a simultaneous op completion if it equals a 2-bit constant specified in bits 1:0, 502 loaded in the configure register 500. This allows FW to select one of four values. The configure register 500 also has the bit 2, 504 to enable this function. The bits 5:3, 414 of the common header byte 1, 404 is the order of this CB in the chain, 000=last, 001=second last, and the like. The bits 2:0, 412 of the common header byte 1, 404 is the WQ 308 shown in FIG. 3 to start after all the simultaneous ops have completed.

FIG. 5B illustrates an example 4 byte op Done Event Queue Entry generally designated by the reference character 510 for implementing storage adapter performance optimization with chained hardware operations completion coalescence in accordance with the preferred embodiment. The 4 byte op Done Event Queue Entry 510 is the Event Queue entry for an op completion consisting of a 1-byte event ID 7:0, 512 and a 3-byte pointer to the Command Block including bit 8, 514 '1', bit 9, 516, fail, bit 13:10, 518 status, bit 30:14, 520, CB offset, and bit 31, 522, reserved. The 404 1-byte field in each CB 400, which is the bit 7:0, 512 in the 4 byte op Done Event Queue Entry 510 is the flag that HW writes back to the HW Event Queue, this byte is defined as shown and described with respect to FIG. 4B used for implementing the Hardware op Completion Coalescence of the invention.

In accordance with features of the invention, when the SAS engine 120 issues a SAS op, if the simultaneous bit is set then it will enqueue the next op in the chain to the SAS WQ so that this next op can immediately start. Any number of Command Blocks can thus be started simultaneously and these ops can complete in any order. Then after the HW Event Q engine detects all of the ops have completed without error, then the HW Event Q engine starts the next entry in the Command Block chain.

Figure 6:
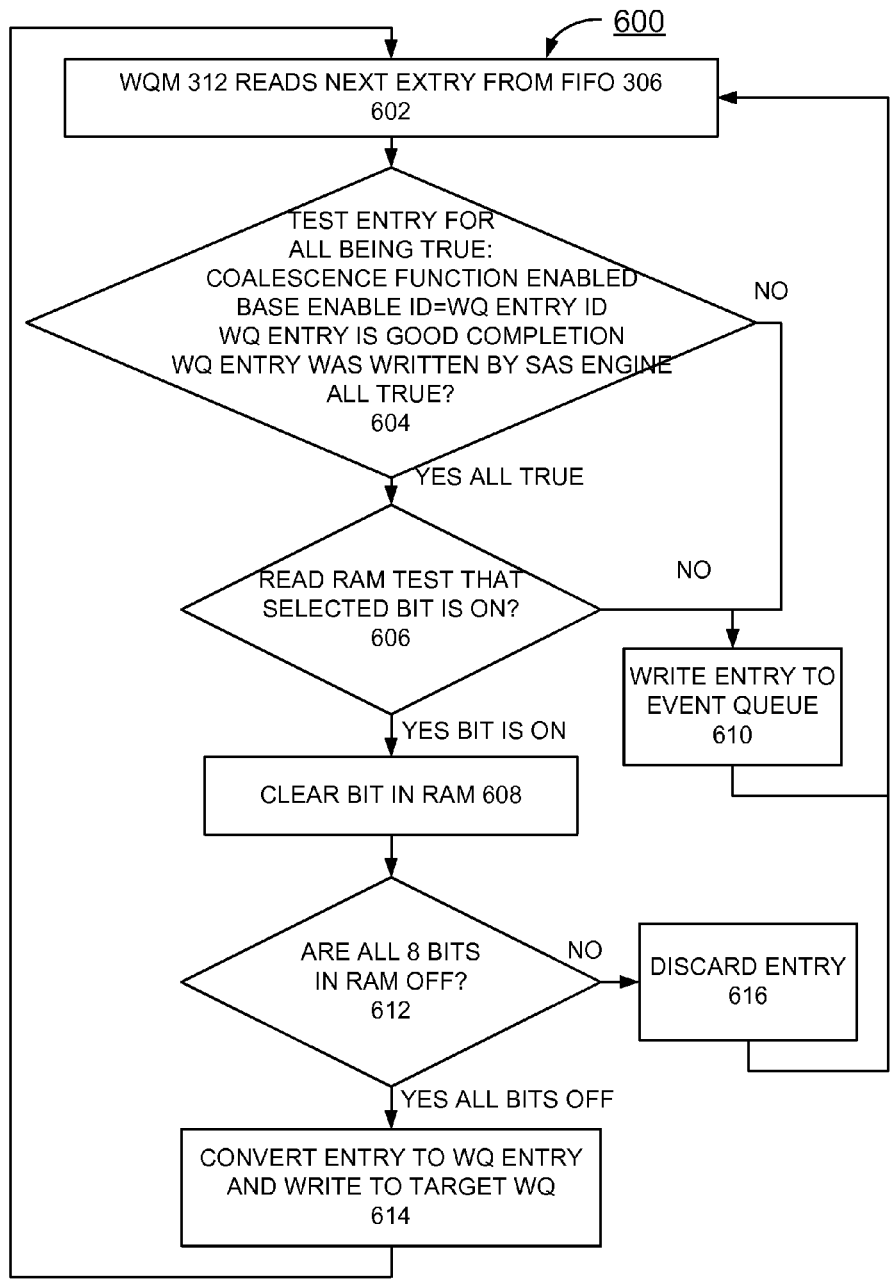
FIG. 6 illustrates example hardware logic operations flow for implementing storage adapter performance optimization with chained hardware operations completion coalescence in accordance with the preferred embodiment.

FIG. 6 illustrates example hardware logic operations flow designated by the reference character 600 for implementing storage adapter performance optimization with chained hardware operations completion coalescence in accordance with the preferred embodiment. As indicated at a block 602, the work queue manager (WQM) reads a next entry from the global HW work queue FIFO 306.

The entry is tested for all being true including whether the coalescence function enabled 504, whether the base enable ID 502 is equal to WQ entry ID 512, whether the WQ entry 510 is a good completion 512, 514, and 516, and whether the WQ entry 510 was written by a SAS engine as indicated at a decision block 604. When all tests are true, then the RAM 314 is read to determine if a selected bit is on as indicated at a decision block 606. When the test bit is on, then the bit is cleared in the RAM 314 as indicated at a block 608. Otherwise when any tests are not true at decision block 604 or when the selected bit is not on at decision block 606, then an entry 510 is written to the HW event queue 310 as indicated at block 610, and the operations return to block 602 and are continued.

After the bit is cleared in the RAM 314 at block 608, then checking the RAM 314 is performed to determine if all 8 bits are off as indicated at a decision block 612. Then when all 8 bits in the RAM 314 are off, the entry is converted to a WQ entry and written to the target WQ 308 as indicated at a block 614. Otherwise if all 8 bits in the RAM 314 are not off at decision block 612, then the entry is discarded as indicated at block 616. Then after the target WQ 308 is written at block 614, or the entry is discarded at block 616, the operations return to block 602 and are continued.

Figure 7:
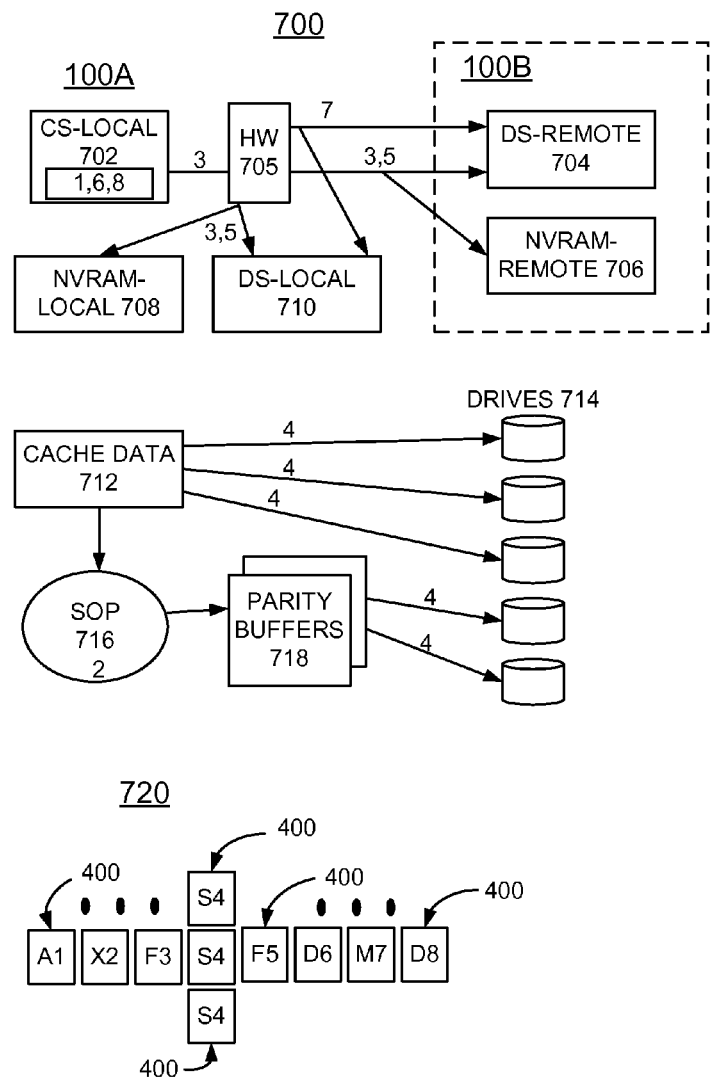
FIG. 7 illustrates example hardware logic operations flow and exemplary operations performed by a predefined chain of a plurality of the command blocks selectively arranged to implement an example RAID write with cache with chained hardware operations completion coalescence in accordance with the preferred embodiment.

Referring to FIG. 7, there are shown hardware logic operations generally designated by the reference character 700 illustrating exemplary operations performed by a predefined chain 720 of a plurality of the command blocks selectively arranged to implement an example RAID write with cache with chained hardware operations completion coalescence in accordance with the preferred embodiment.

Referring also to FIG. 1, there are shown a plurality of example command blocks with the engines 120 in accordance with the preferred embodiment, for example, including each of the command blocks shown in the predefined chain 720 of FIG. 7. The command blocks 400 include: Set/Update/Clear/Mirror FP (Footprint)—F,
Set/Clear/Mirror CL—M,
Send SAS Op—S,
Free Allocated Pages—D,
Run SOP Engine—X,
Allocate Pages—A,
Send HDMA Op—H, and
Comp/Decompression—C.

With the Set/Update/Clear/Mirror FP (Footprint)—F command block 400, CS actions performed by HW or S/U/C/M FP engine 120 include for example, Read 32 Bytes from CS 108, for Set, for each 4K, Read 32 Bytes, Write 32 Bytes to DS 112 and Write 32 Bytes to NVRAM 114, and optionally mirror to remote controller; for Update, Read 32 Bytes from CS 108 or DS 112, Write 32 Bytes to DS 112 and Write 32 Bytes to NVRAM 114, and optionally mirror to remote controller; and for Clear, Write 32 Bytes to DS 112 and Write 32 Bytes to NVRAM 114, and optionally mirror to remote controller.

With the Set/Clear/Mirror CL—M command block 400, CS actions performed by HW or S/C/M CL engine 120 include for example, Read 32 Bytes from CS 108, for Set, for each 4K, Read 32 Bytes, Write 32 Bytes to DS 112 and For each 4K, Read 4 byte index, and may read 4K from DS 112 and optionally mirror to remote controller; and for Clear, For each 4K, Read 4 byte index, and Write 32 Bytes to DS 112 and optionally mirror to remote controller.

With the Send SAS Op—S command block 400 and the Send HDMA Op—H, CS actions performed by HW or the respective SAS engine 120 and the HDMA engine 120 include for example, For each 4K, SAS engine 120 and the HDMA engine 120 Read 4 byte index, and HDMA engine 120 will Read or Write 4K to DS 112, and SAS engine 120 may read and write 4K to DS 112. The HDMA engine 120 moves data between DS 112 and the host system 134, and the SAS engine 120 moves data between DS 112, and the storage devices 132.

With the Free Allocated Pages—D and the Allocate pages—A command blocks 400, CS actions performed by HW or the Alloc/Dealloc engine 120 include for example, for each 4K, Read 4 Bytes, and Write 4 Bytes.

With the Run SOP Engine—X command block 400, CS actions performed by HW or the XOR engine 120 include for example, For each 4K of Source (for each source), Read 4 Bytes, and Read 4K of DS 112; and For each 4K of Destination (for each destination), Read 4 Bytes, and Write 4K of DS 112. The sum-of-products (SOP) engine 120 takes an input of 0-N source page lists and 0-M destination page lists as well as an N×M array of multipliers. For example, N=18 and M=2. For each 4K, the first source page is read from DRAM and the first set of M multipliers are applied to each byte. The resulting data is put into M on chip accumulation buffers. Each subsequent source page is multiplied by its associated M multipliers and the product XORed with the corresponding accumulation buffers. When every source has been processed, the accumulation buffers are written out to the corresponding M destination buffers. Then, the next 4K is started. This allows computing an N input XOR to compute RAID-5 parity or N input multiply XOR of M equations simultaneously for Reed-Solomon based RAID-6 P & Q redundancy data.

With the Comp/Decompression—C command block 400, CS actions performed by HW or the Comp/Decomp engine 120 include for example, For each logical 4K (compressed data may be <4K), Read 4 Bytes, and Read 4K of DS 112 (or less if doing decompression), Read 4 Bytes, and Write 4K of DS 112 (or less if doing compression), and optionally other operations may be performed.

Referring to FIG. 7, the chain 720 of command blocks 400 include command blocks A1, X2, F3, separated by a plurality of simultaneous command blocks S4, and command blocks F5, D6, M7, and D8, with respective steps 1-8 shown with hardware logic operations 700.

In FIG. 7, the illustrated hardware logic operations 700 include a local CS 702 of a first or local controller 100A coupled by a hardware engine 705 to a remote DS 704 and to a remote NVRAM 706 of a second or remote controller 100B. The local CS 702 is coupled by the HW engine 705 to a local NVRAM 708, and to a local DS 710 of the first controller 100A. Cache Data 712 of the first controller are coupled to a plurality of Drives 714 and a sum of products (SOP) engine 716 coupled by Parity Buffers 718 to a pair of the Drives 714. For RAID-6, there are two Parity Buffers 718 and two Drives 714, while for RAID-5, one Parity Buffer 718 and one Drive 714 can be used.

In step 1, Page lists are allocated or populated if needed at command block A1 of chain pair 720, at CS local 702. Next in Step 2, Run SOP engine 716 is performed generating parity or P and Q redundancy data at command block X2 of chain pair 720, at 2 SOP 716.

In step 3, set footprint is performed at command block F3 of chain pair 720, read by HW engine 705, line 3 from HW engine 705 to DS 710 and NVRAM 708 on the local controller 100A and set footprint on the remote controller 100B line 3 from HW engine 705 to remote DS 704 and NVRAM 706.

In step 4, performing overlapped Write data to multiple Drives 714 is provided as indicated at multiple parallel command blocks S4 of chain pair 720, lines 4 from Cache Data 712 to multiple Drives 714 in FIG. 7. After a last one of the plurality of simultaneous command blocks S4 complete, then the next command block F5 is started in accordance with the invention.

In step 5, Clear footprint is performed writing zeros by HW engine 705 at command block F5 of chain 720, at line 5 from HW engine 705 to DS 710 and NVRAM 708 on the local controller 100A and clear footprint on the remote controller 100B at line 6 from HW engine 705 to remote DS 704 and remote NVRAM 706. In step 6, Page lists are de-allocated or depopulated if needed at command block D6 of chain 720, at CS local 702. In step 7, Cache update to clear CL writing zeros by hardware engine 705 on local DS 710 and to clear CL on remote DS 704 at command block M7 of chain pair 720, at line 7 from hardware engine 705 to local DS 710 and to remote DS 704. In step 8, Cache page lists are de-allocated or depopulated at command block D8 of chain pair 720, at CS local 702.

Figure 8:
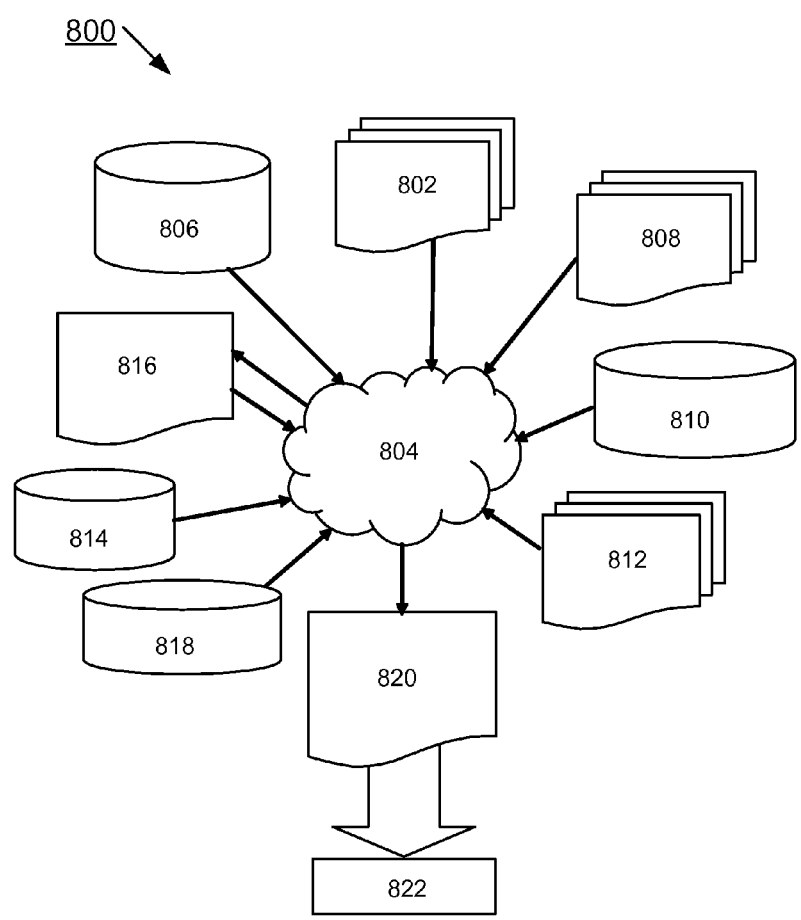
FIG. 8 is a flow diagram of a design process used in semiconductor design, manufacturing, and/or test.

FIG. 8 shows a block diagram of an example design flow 800. Design flow 800 may vary depending on the type of IC being designed. For example, a design flow 800 for building an application specific IC (ASIC) may differ from a design flow 800 for designing a standard component. Design structure 802 is preferably an input to a design process 804 and may come from an IP provider, a core developer, or other design company or may be generated by the operator of the design flow, or from other sources. Design structure 802 comprises circuits 100, 200, 300, 400, 401, 404, 500, 510, 600, 700 in the form of schematics or HDL, a hardware-description language, for example, Verilog, VHDL, C, and the like. Design structure 802 may be contained on one or more machine readable medium. For example, design structure 802 may be a text file or a graphical representation of circuits 100, 200, 300, 400, 401, 404, 500, 510, 600, 700. Design process 804 preferably synthesizes, or translates, circuits 100, 200, 300, 400, 401, 404, 500, 510, 600, 700 into a netlist 806, where netlist 806 is, for example, a list of wires, transistors, logic gates, control circuits, I/O, models, etc. that describes the connections to other elements and circuits in an integrated circuit design and recorded on at least one of machine readable medium. This may be an iterative process in which netlist 806 is resynthesized one or more times depending on design specifications and parameters for the circuit.

Design process 804 may include using a variety of inputs; for example, inputs from library elements 808 which may house a set of commonly used elements, circuits, and devices, including models, layouts, and symbolic representations, for a given manufacturing technology, such as different technology nodes, 32 nm, 45 nm, 90 nm, and the like, design specifications 810, characterization data 812, verification data 814, design rules 816, and test data files 818, which may include test patterns and other testing information. Design process 804 may further include, for example, standard circuit design processes such as timing analysis, verification, design rule checking, place and route operations, and the like. One of ordinary skill in the art of integrated circuit design can appreciate the extent of possible electronic design automation tools and applications used in design process 804 without deviating from the scope and spirit of the invention. The design structure of the invention is not limited to any specific design flow.

Design process 804 preferably translates an embodiment of the invention as shown in FIGS. 1, 2, 3, 4A, 4B, 5A, 5B, 6, and 7 along with any additional integrated circuit design or data (if applicable), into a second design structure 820. Design structure 820 resides on a storage medium in a data format used for the exchange of layout data of integrated circuits, for example, information stored in a GDSII (GDS2), GL1, OASIS, or any other suitable format for storing such design structures. Design structure 820 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2, 3, 4A, 4B, 5A, 5B, 6, and 7. Design structure 820 may then proceed to a stage 822 where, for example, design structure 820 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
a controller comprising
a plurality of hardware engines;
a processor;
a plurality of command blocks selectively arranged by firmware in a predefined chain including a plurality of simultaneous command blocks;
said simultaneous command blocks being executed simultaneously and completed in any order by respective hardware engines, and
a next command block in the predefined chain being started under hardware control without any hardware-firmware (HW-FW) interlocking with simultaneous command block completion coalescence of said simultaneous command blocks.

2. The data storage system as recited in claim 1 wherein each of said command blocks being arranged to control an operation in one of said plurality of hardware engines, each said command block including a command block identification (ID), a command block chain position, and a next command block ID.

3. The data storage system as recited in claim 1 includes a coalescence status random access memory (RAM) for storing predefined information for each of the command blocks in said predefined chain including a plurality of simultaneous command blocks.

4. The data storage system as recited in claim 3 includes an event queue coupled to said processor, and an event queue entry being written to said event queue responsive to completion of a last in chain command block.

5. The data storage system as recited in claim 4 wherein said event queue entry being written to said event queue responsive to a command block fail with an error.

6. The data storage system as recited in claim 4 includes HW engine event queue logic for blocking said event queue entry being written to said event queue responsive to said simultaneous command blocks being completed.

7. The data storage system as recited in claim 6 wherein said HW engine event queue logic verifies a good completion of respective simultaneous command blocks.

8. The data storage system as recited in claim 3 includes HW engine event queue logic for checking predefined bits in said coalescence status RAM for starting said next command block in the predefined chain after all said simultaneous command blocks complete.

9. The data storage system as recited in claim 8 includes said HW engine event queue logic responsive to checking predefined bits in said coalescence status RAM, clearing a selected bit in said coalescence status RAM.

10. The data storage system as recited in claim 9 includes said HW engine event queue logic responsive to clearing said selected bit, checking predefined bits in said coalescence status RAM and generating a work queue entry for starting said next command block in the predefined chain.

11. The data storage system as recited in claim 8 includes said HW engine event queue logic responsive to checking predefined bits in said coalescence status RAM, writing said event queue entry to said event queue.

12. The data storage system as recited in claim 8 includes said HW engine event queue logic responsive to checking predefined bits in said coalescence status RAM, checking a selected bit in said coalescence status RAM, and generating a work queue entry for starting said next command block in the predefined chain responsive to checking said selected bit.

13. A method for implementing storage adapter performance optimization with chained hardware operations completion coalescence in a data storage system comprising:
providing a controller comprising a plurality of hardware engines; and a processor;
providing a plurality of command blocks selectively arranged by firmware in a predefined chain including a plurality of simultaneous command blocks;
simultaneously executing and completing said simultaneous command blocks in any order by respective hardware engines, and
starting a next command block in the predefined chain under hardware control without any hardware-firmware (HW-FW) interlocking with a simultaneous command block completion coalescence of said simultaneous command blocks.

14. The method as recited in claim 13 includes providing each said command block being arranged to control an operation in one of said plurality of hardware engines, each said command block including a command block identification (ID), a command block chain position, and a next command block ID.

15. The method as recited in claim 13 includes providing an event queue coupled to said processor, and writing an event queue entry responsive to completion of a last in chain command block, and writing an event queue entry responsive to a command block fail with an error.

16. The method as recited in claim 13 includes providing a coalescence status random access memory (RAM) for storing predefined information for each of the command blocks in said predefined chain including a plurality of simultaneous command blocks.

17. The method as recited in claim 16 includes checking predefined bits in said coalescence status RAM and generating a work queue entry for starting said next command block in the predefined chain after all said simultaneous command blocks complete.

18. The method as recited in claim 16 includes testing predefined bits in said coalescence status RAM and responsive to testing predefined bits, clearing a selected bit in said coalescence status RAM and responsive to clearing a selected bit, checking predefined bits in said coalescence status RAM for starting said next command block in the predefined chain.

19. A controller for implementing storage adapter performance optimization with chained hardware operations completion coalescence in a data storage system comprising:
a plurality of hardware engines;
a processor;
a plurality of command blocks selectively arranged by firmware in a predefined chain including a plurality of simultaneous command blocks;
said simultaneous command blocks being simultaneously executed and completed in any order by respective hardware engines, and
a next command block in the predefined chain being started under hardware control without any hardware-firmware (HW-FW) interlocking with a simultaneous command block completion coalescence of said simultaneous command blocks.

20. The controller as recited in claim 19 wherein each said command block includes a common header including a command block identification (ID), a command block chain position, and a next command block ID.

21. The controller as recited in claim 20 includes a coalescence status random access memory (RAM) for storing predefined information for each of the command blocks in said predefined chain including a plurality of simultaneous command blocks; and a work queue manager using said common header and said predefined information stored in said coalescence status RAM for test and coalesce said simultaneous command blocks before starting said next command block in the predefined chain.

22. A design structure embodied in a non-transitory machine readable medium used in a design process, the design structure comprising:
a controller circuit tangibly embodied in the non-transitory machine readable medium used in the design process, said controller circuit for implementing storage adapter performance optimization with chained hardware operations completion coalescence in a data storage system, said controller circuit comprising: a plurality of hardware engines; a processor;
a plurality of command blocks selectively arranged by firmware in a predefined chain including a plurality of simultaneous command blocks;
said simultaneous command blocks being simultaneously executed and completed in any order by respective hardware engines, and
a next command block in the predefined chain being started under hardware control without any hardware-firmware (HW-FW) interlocking with a simultaneous command block completion coalescence of said simultaneous command blocks, when read and used in manufacture of a semiconductor chip produces a chip comprising said controller circuit.

23. The design structure of claim 22, wherein the design structure comprises a netlist, which describes said controller circuit.

24. The design structure of claim 22, wherein the design structure resides on storage medium as a data format used for exchange of layout data of integrated circuits.

25. The design structure of claim 22, wherein the design structure includes at least one of test data files, characterization data, verification data, or design specifications.

* * * * *